A. KNISTROM.
CARD PUNCHING DEVICE.
APPLICATION FILED DEC. 12, 1919.

1,397,007.

Patented Nov. 15, 1921.
18 SHEETS—SHEET 1.

Inventor
August Knistrom
By his Attorneys
Knox, Page, Cooper & Hayward

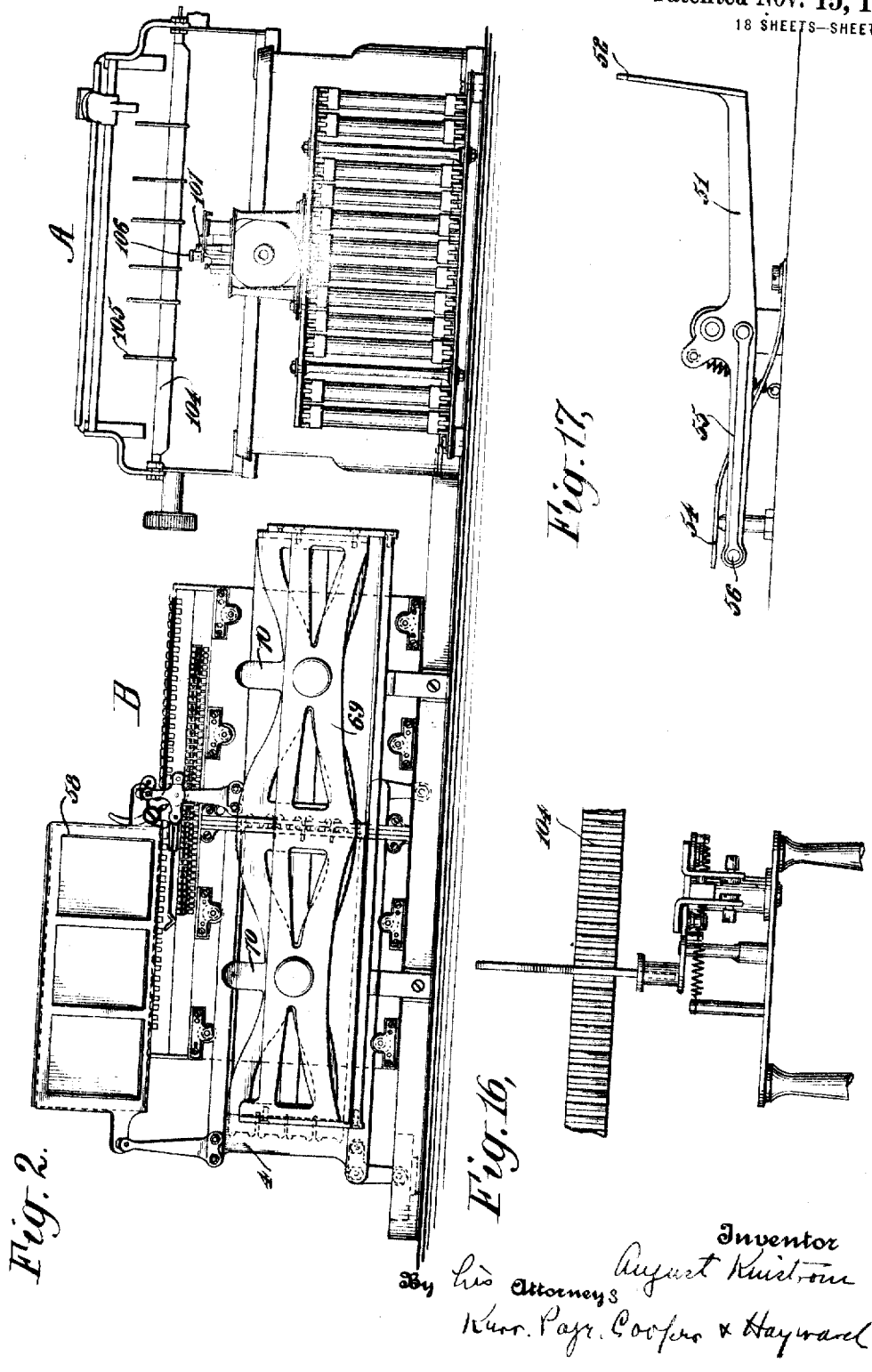

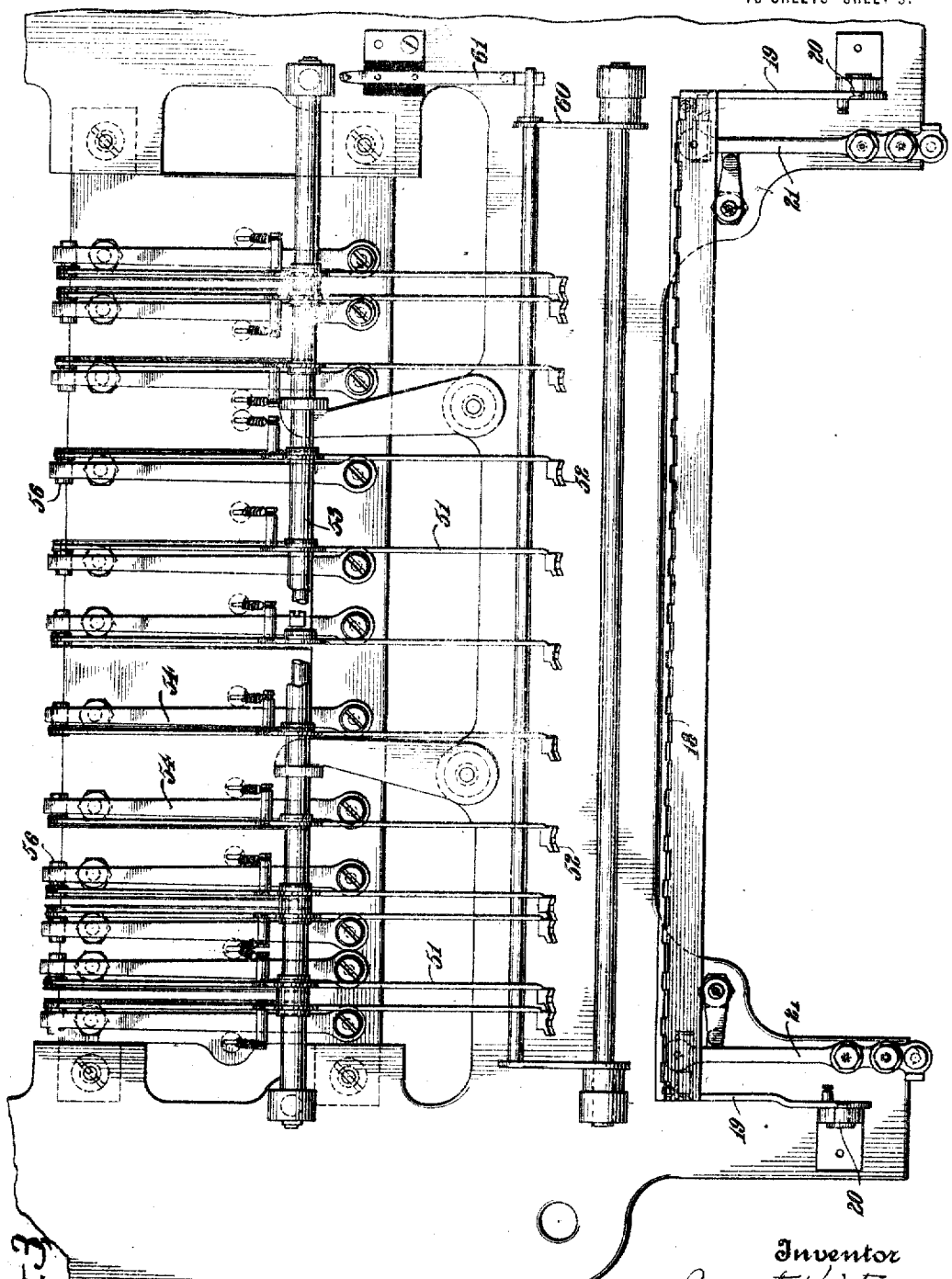

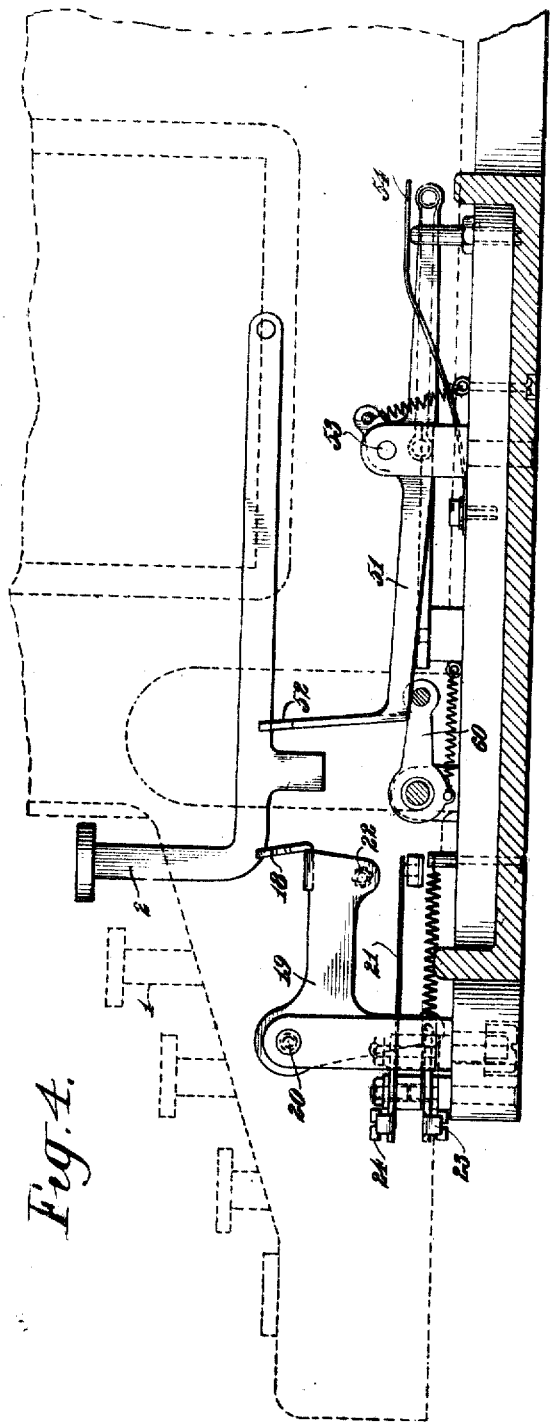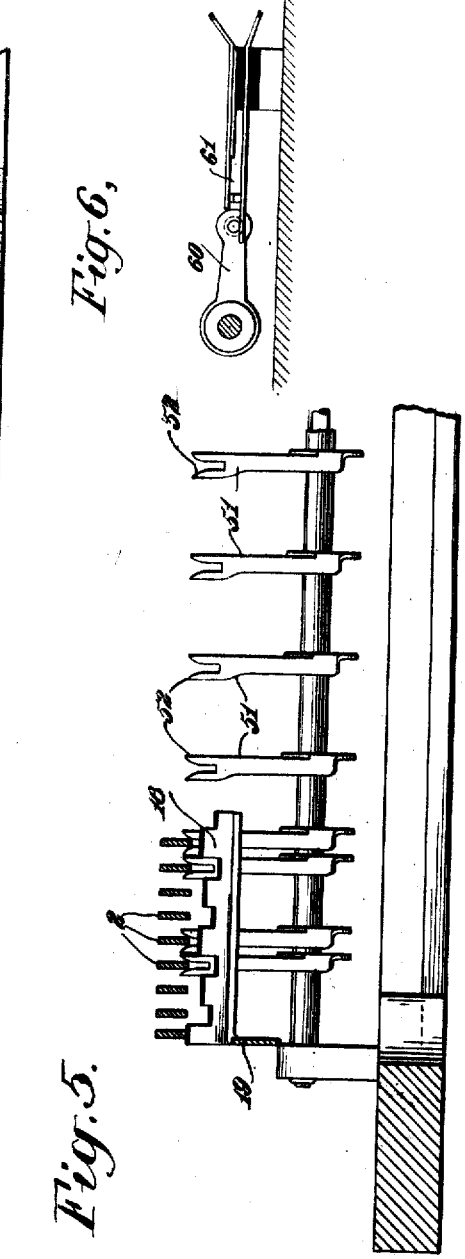

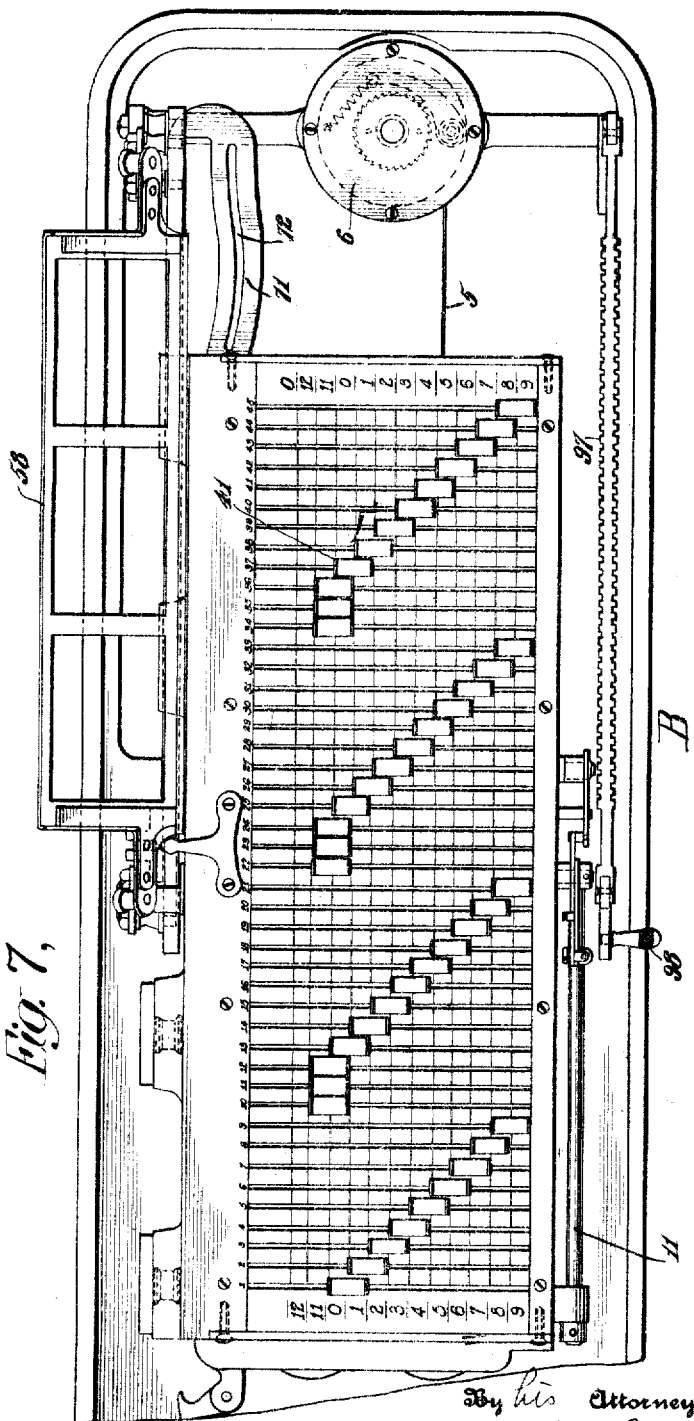

A. KNISTROM.
CARD PUNCHING DEVICE.
APPLICATION FILED DEC. 12, 1919.
1,397,007.
Patented Nov. 15, 1921.
18 SHEETS—SHEET 6.
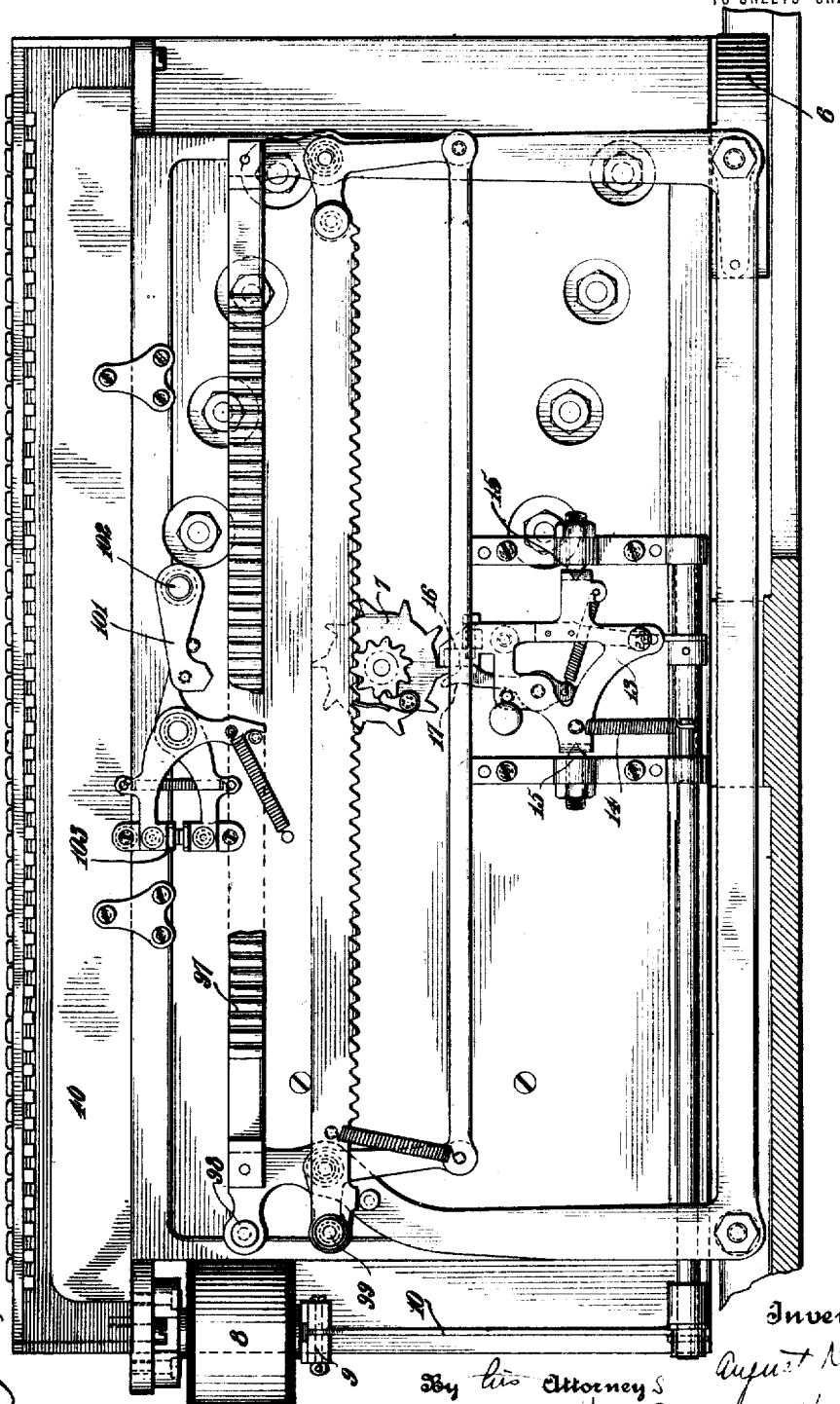

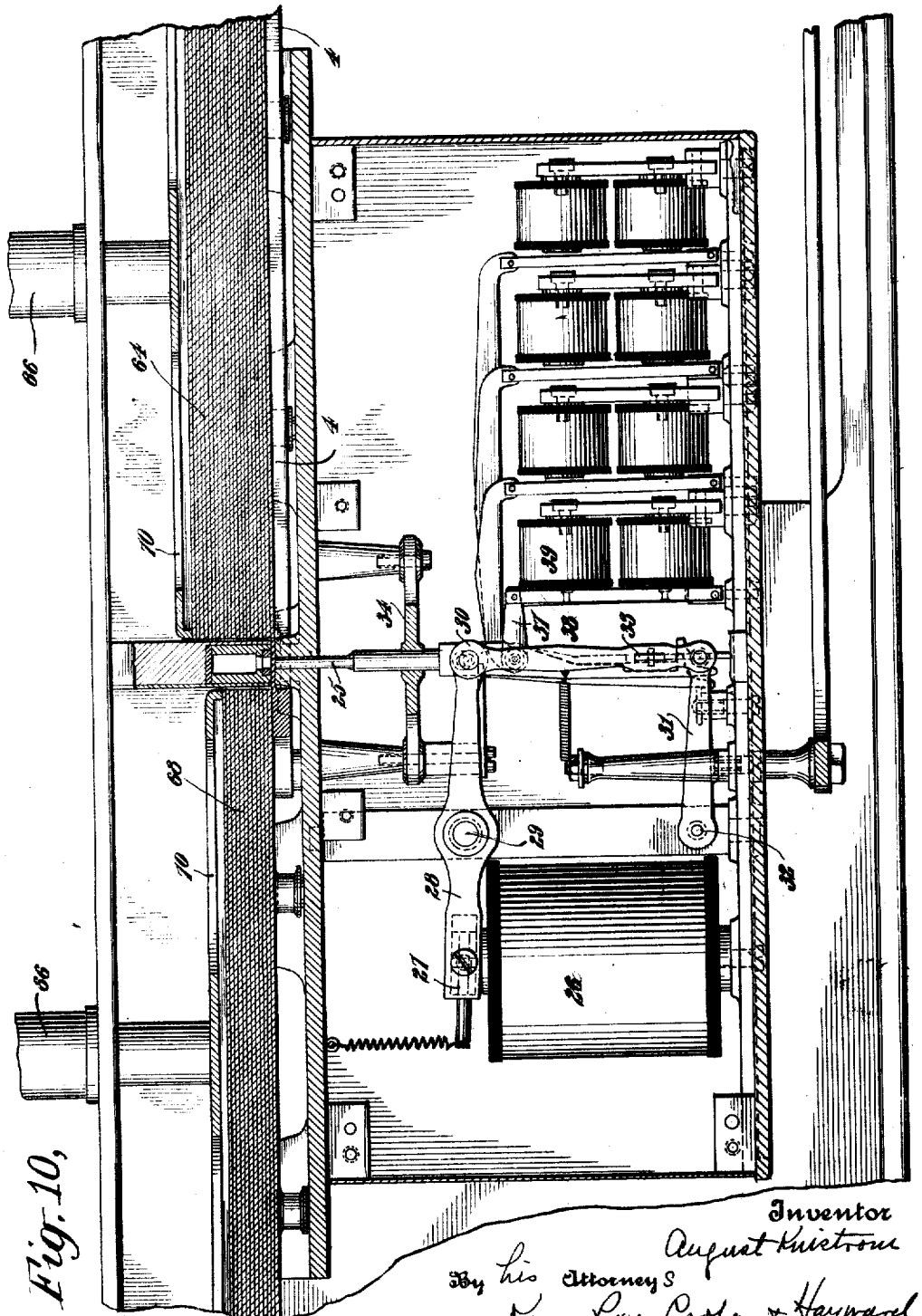

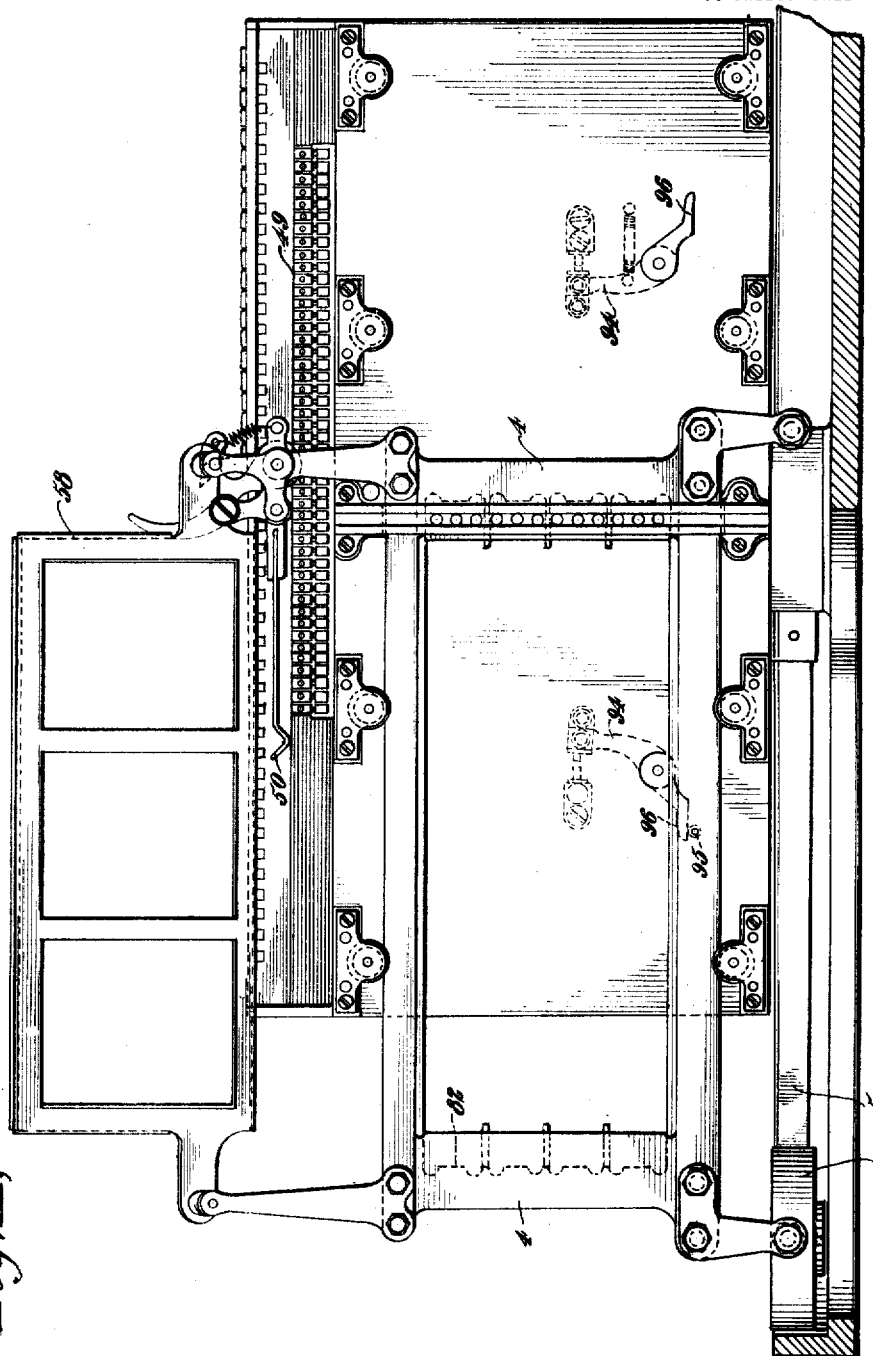

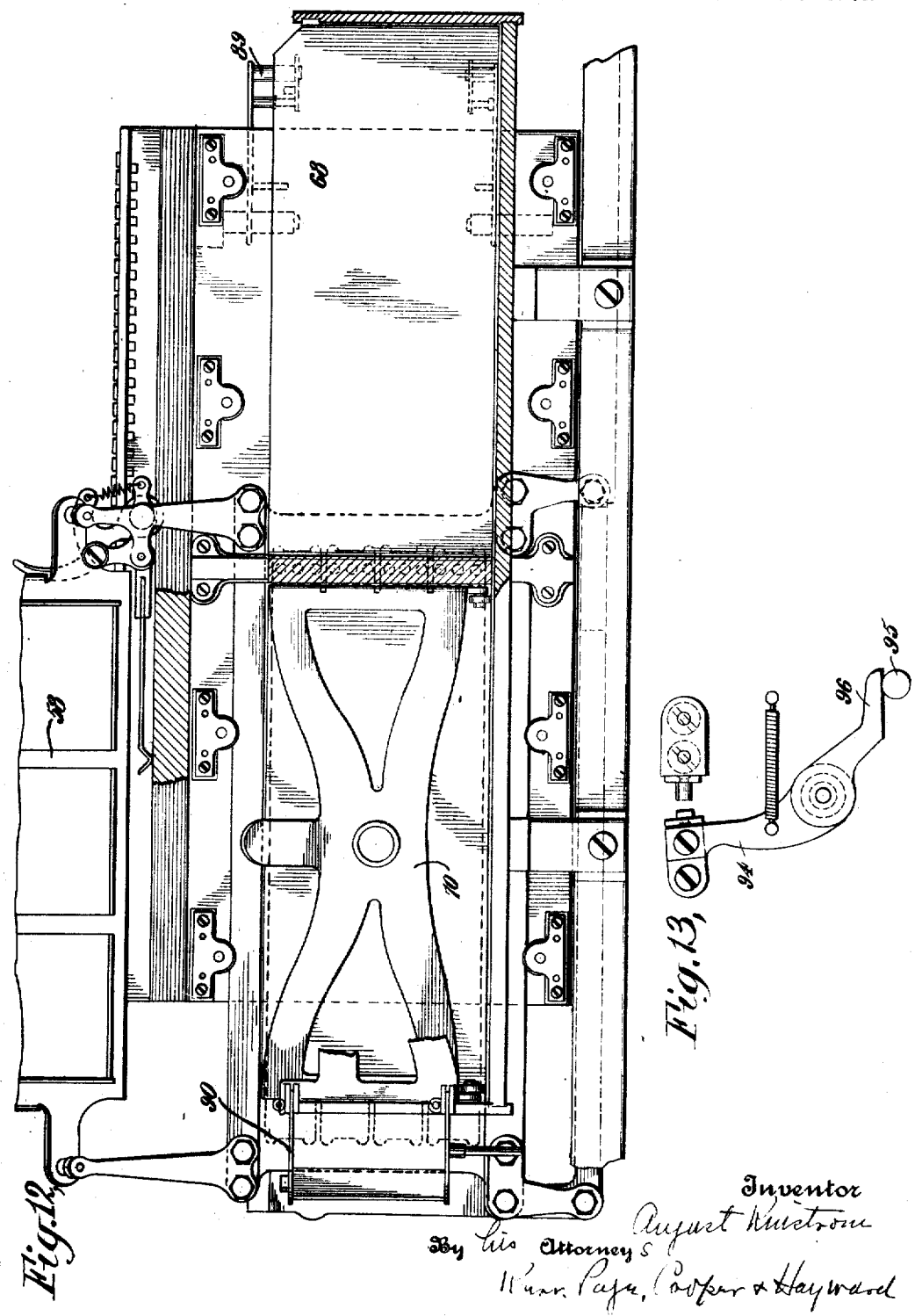

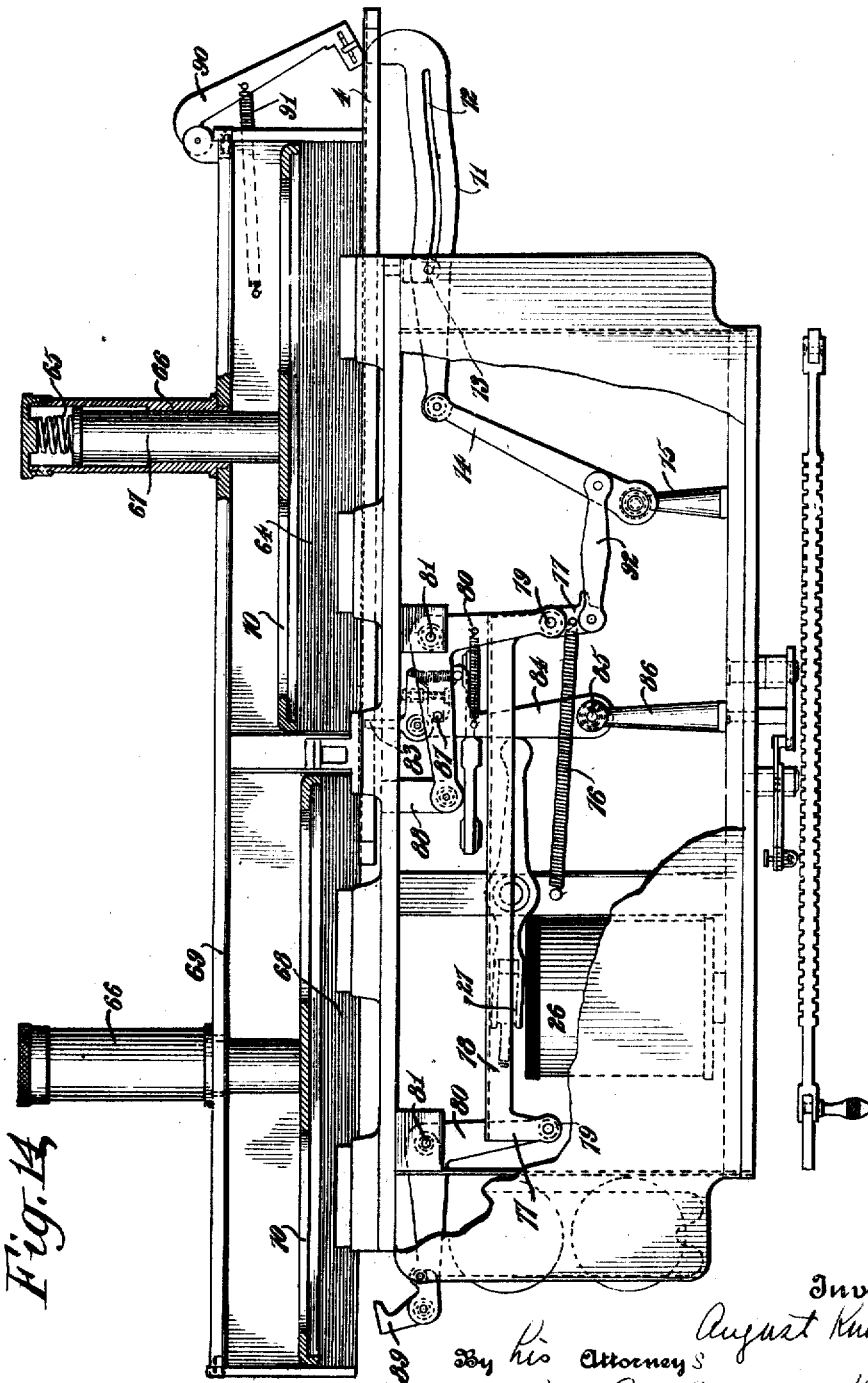

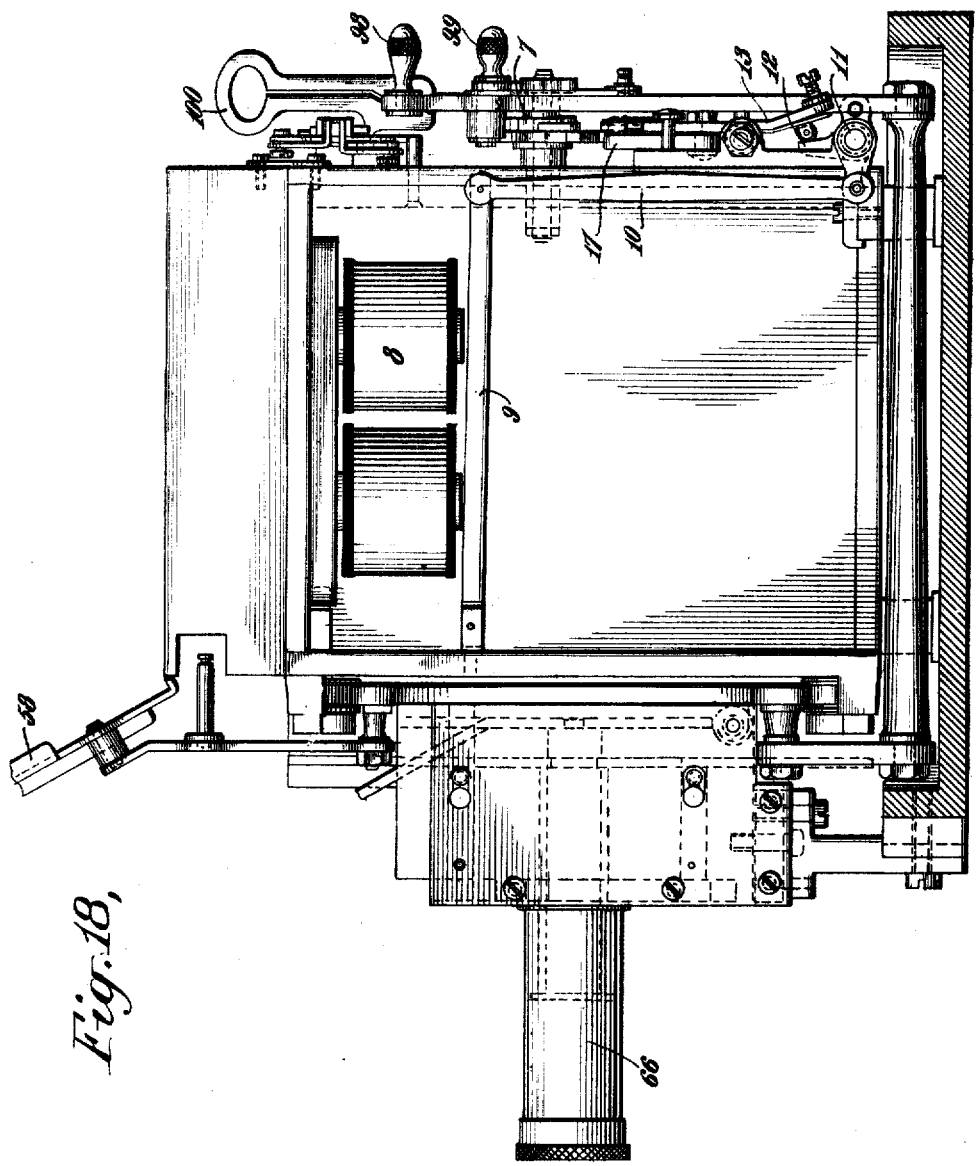

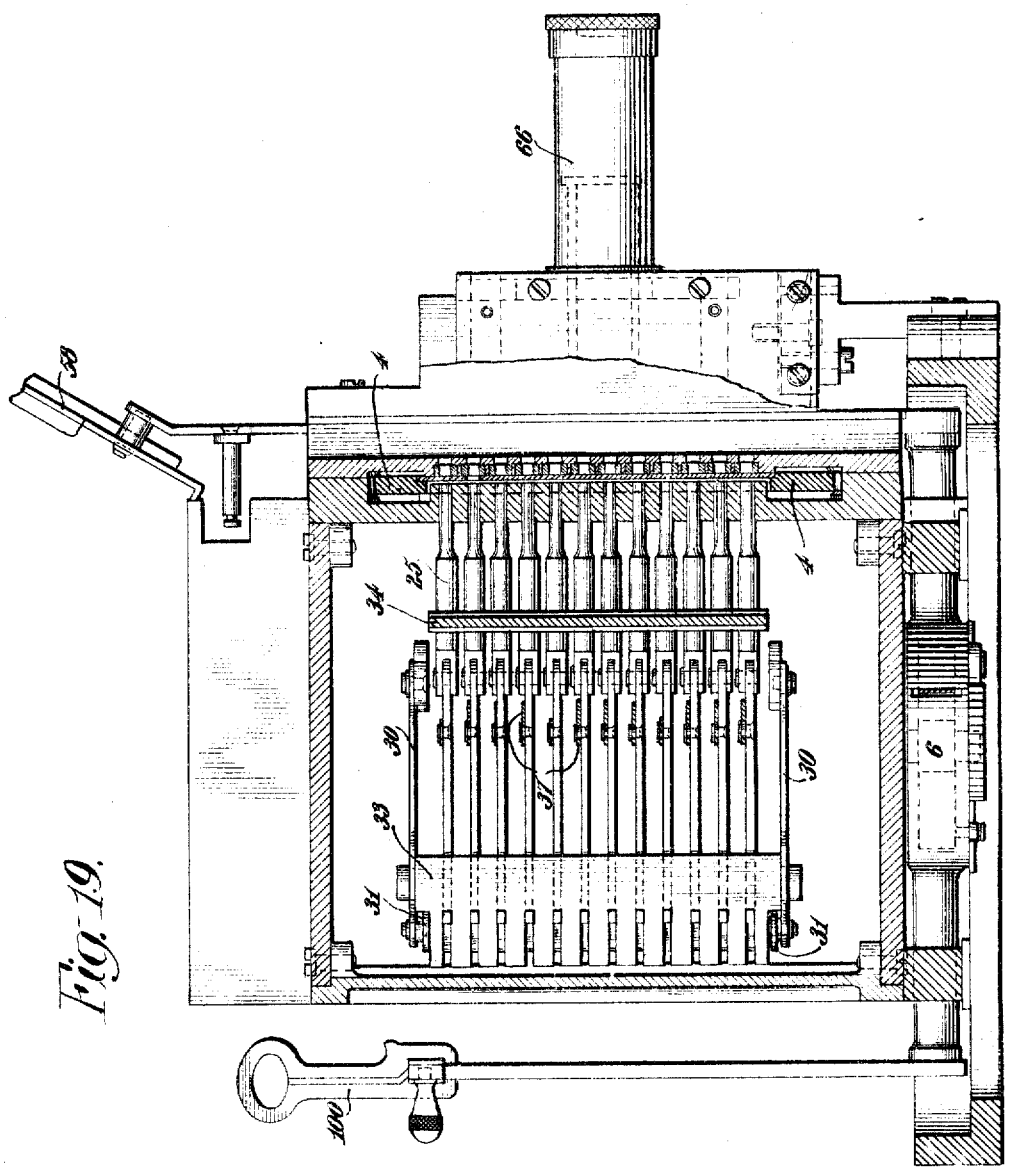

A. KNISTROM.
CARD PUNCHING DEVICE.
APPLICATION FILED DEC. 12, 1919.

1,397,007.

Patented Nov. 15, 1921.
18 SHEETS—SHEET 14.

Inventor
August Knistrom
By his Attorneys
Knox, Page, Cooper & Hayward

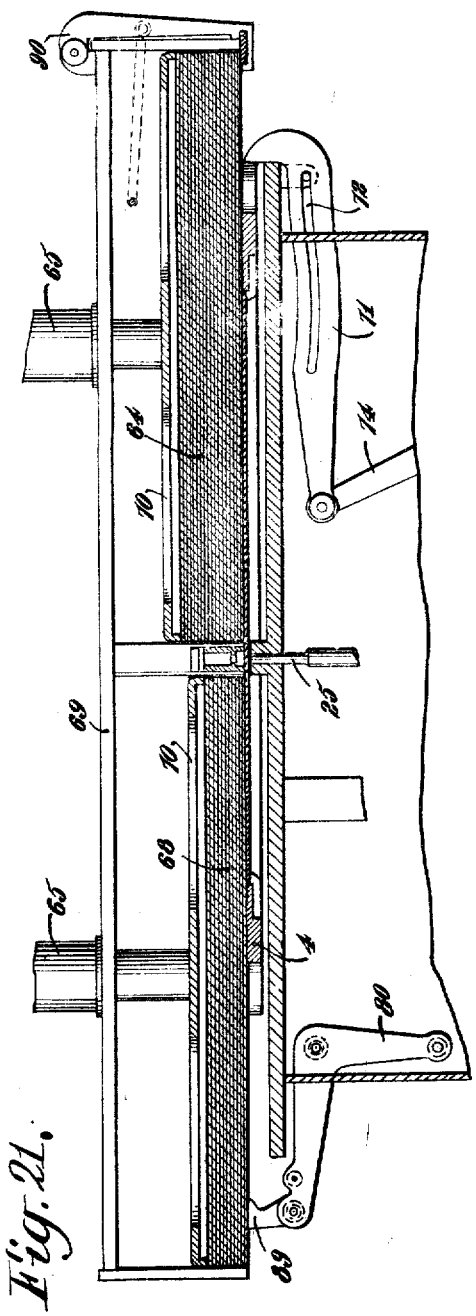
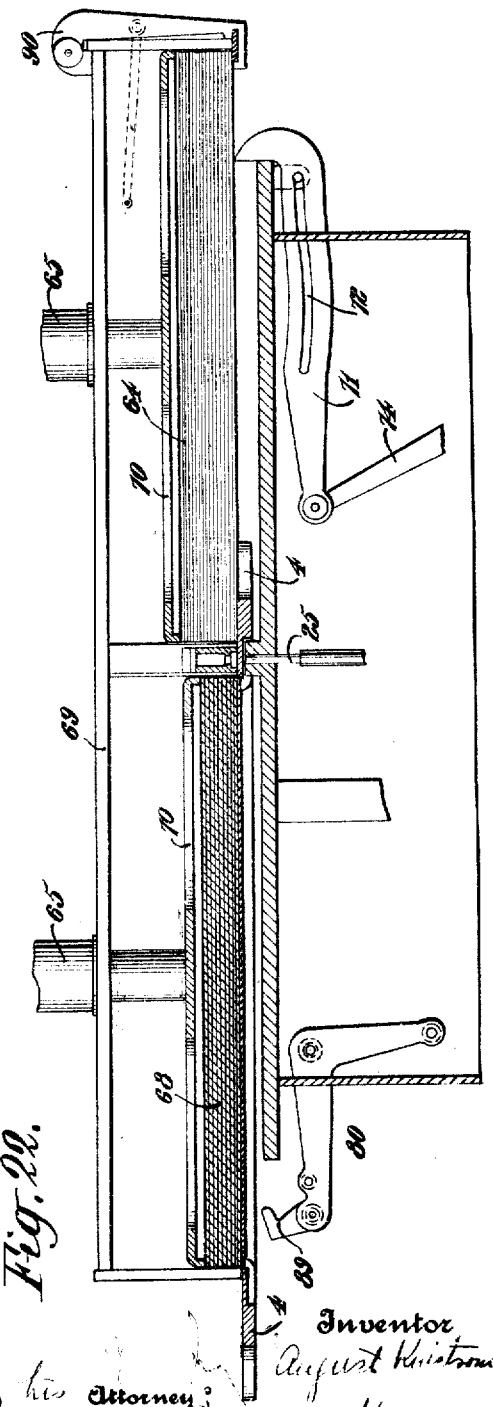

A. KNISTROM.
CARD PUNCHING DEVICE.
APPLICATION FILED DEC. 12, 1919.
1,397,007.
Patented Nov. 15, 1921.
18 SHEETS—SHEET 16.
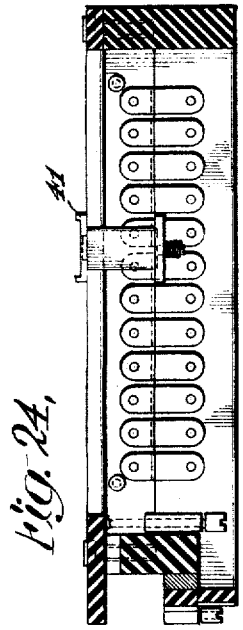
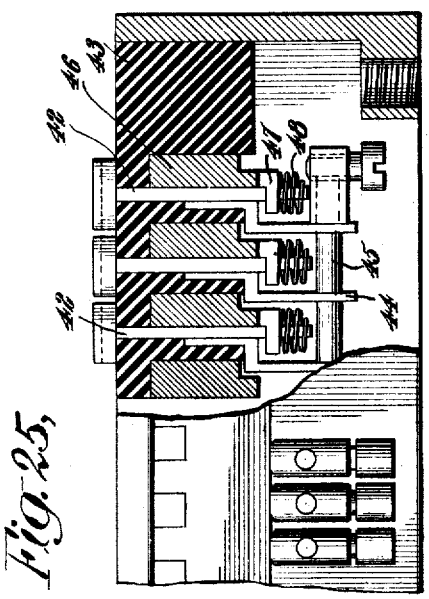
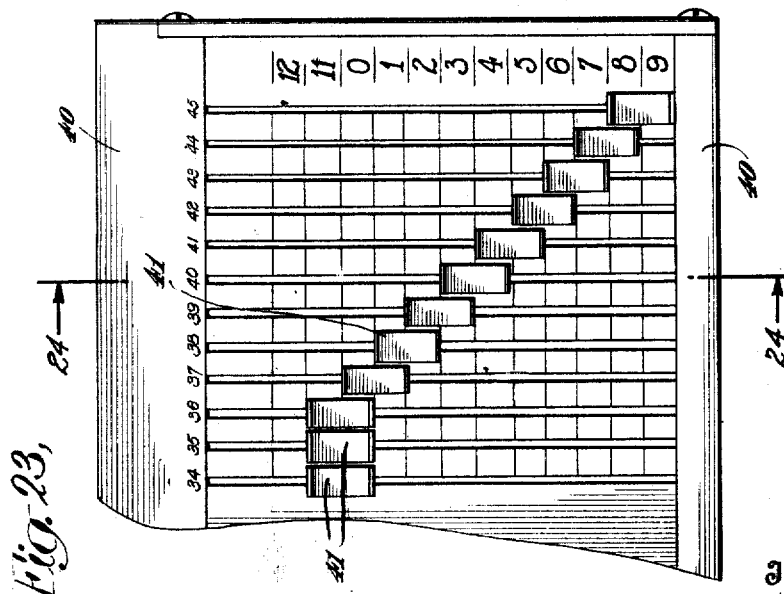
Inventor
August Knistrom
By his Attorneys A. KNISTROM.
CARD PUNCHING DEVICE.
APPLICATION FILED DEC. 12, 1919.
1,397,007.
Patented Nov. 15, 1921.
18 SHEETS—SHEET 17.
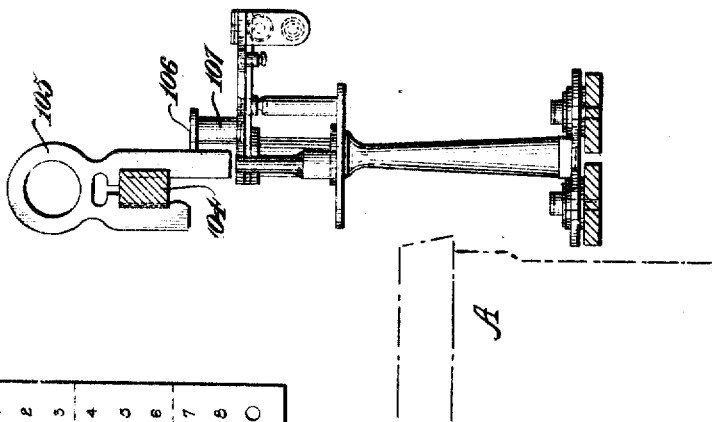
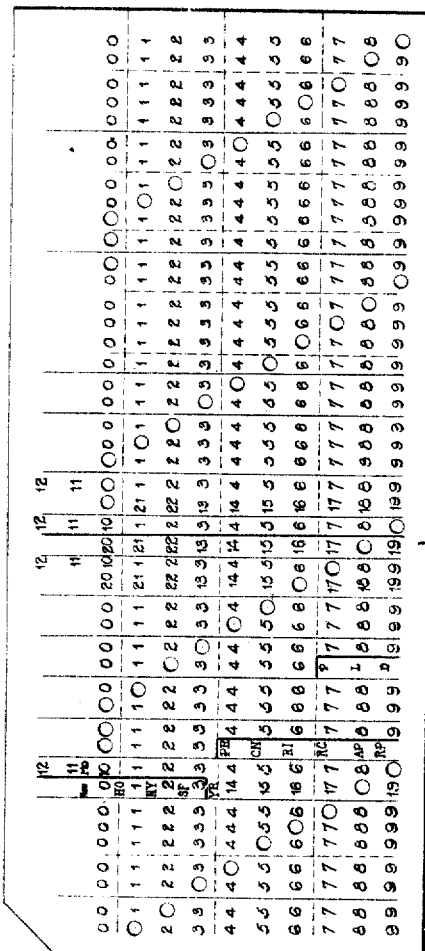
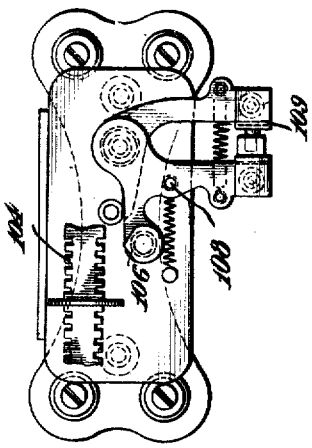

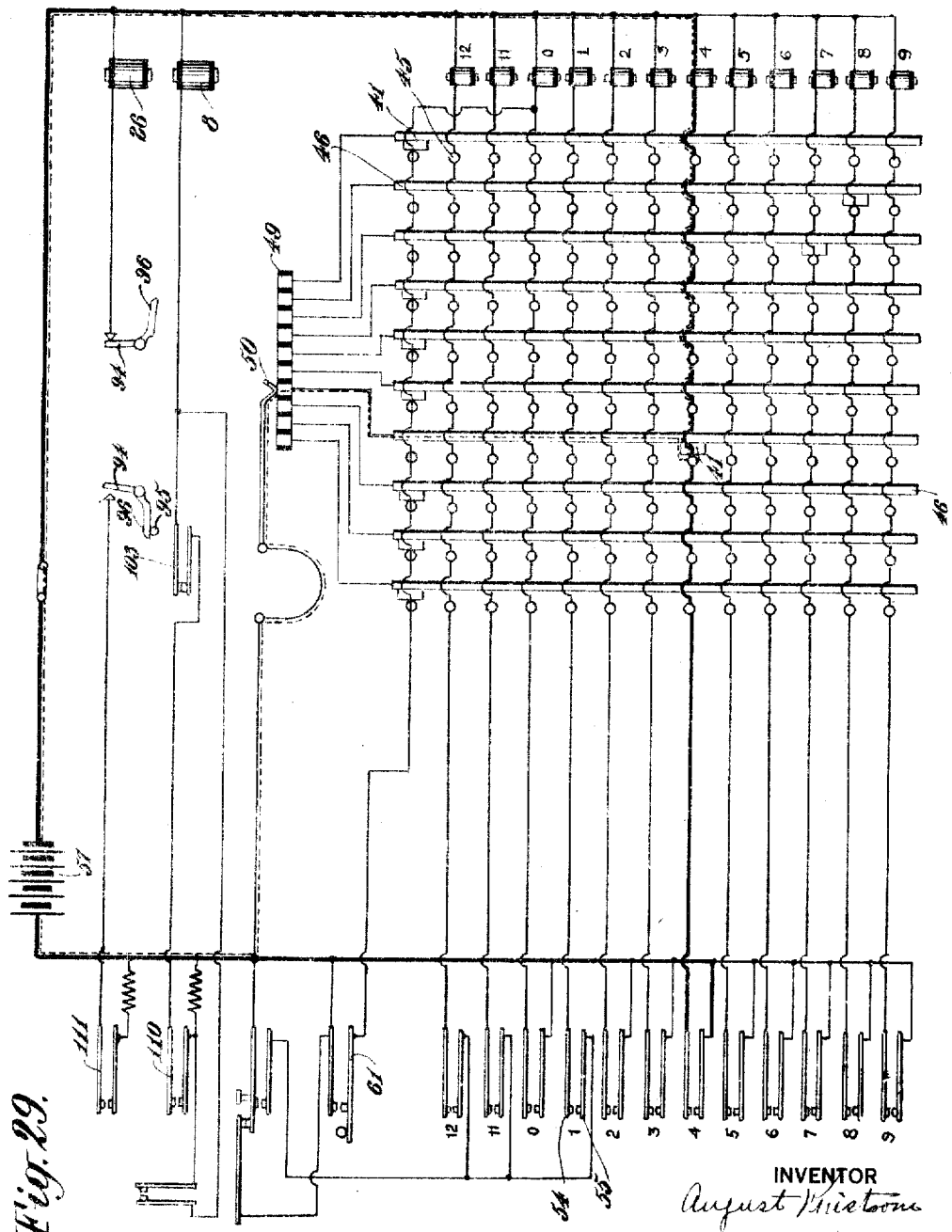

UNITED STATES PATENT OFFICE.

AUGUST KNISTROM, OF BINGHAMTON, NEW YORK, ASSIGNOR TO THE TABULATING MACHINE COMPANY, A CORPORATION OF NEW JERSEY.

CARD-PUNCHING DEVICE.

1,397,007.     Specification of Letters Patent.     Patented Nov. 15, 1921.

Application filed December 12, 1919. Serial No. 344,375.

*To all whom it may concern:*

Be it known that I, AUGUST KNISTROM, a subject of the King of Sweden, residing at Binghamton, in the county of Broome and State of New York, have invented certain new and useful Improvements in Card-Punching Devices, of which the following is a full, clear, and exact description.

The invention which forms the subject of this application for Letters Patent resides in the combination with an ordinary printing typewriter of a punching attachment for tabulator cards, designed and adapted to be operated by the typewriter mechanism in such manner that the cards punched thereby will by the number and position of the holes therein indicate the data and information printed by the operation of the typewriter keys. An understanding of the nature and purpose of the invention may best be derived from the following statement of a specific example of its use.

Let it be assumed that a certain customer purchases from a given salesman, on a given date and at a given place, a list of articles of merchandise, or different lists on different dates, and that at the end of the month a bill for all purchases is made out in the usual manner on an ordinary typewriter. It may be further assumed that the seller may at any time thereafter wish to ascertain just what articles had been sold to that particular customer, or by whom, when and where they were sold, or the total amount paid or due for any particular article or any other like information, but it is well known that the simplest and readiest means of gaining such information, whenever the proportions of the business are such as to make a detailed examination of the books and ledgers a laborious operation, is to tabulate the transactions and items on punched cards, to sort out all cards containing such items as may be needed and determine from them the data or information required; for example, it may be desired to ascertain what total quantity of given articles of merchandise has been purchased by a certain party in a given time, or what was sold by a certain salesman or any other kindred information, in which case the cards punched to show these facts are sorted out mechanically and then passed through a tabulating machine.

Heretofore, it has been customary to typewrite the bill or bills, and then by a separate operation, record by holes punched in cards by a tabulating machine, each transaction or item, and, in case of need, use these cards for ascertaining any of the facts thus recorded, and, so far as I am aware, no practicable means has ever been produced or even proposed, which by the mere operation of the typewriter will effect the proper punching of tabulator cards to preserve in this form a complete record of the transactions as shown by the printed bills or invoices.

This means I have succeeded in producing in a practical and efficient form, and my invention consists in the combination with a typewriter of any known and usual construction of a card punching attachment or mechanism which will be operated by the typewriter mechanism and will record by holes punched in cards whatever facts or data the typewriting machine may print. In other words, I provide means by which the printed items such as dates, places, persons and the like will be indicated by certain punched number holes in the cards and the printed numbers by certain other punched holes, one card being punched for each different date or other item, and all of which collectively correspond to the original printed bill, invoice or other instrument, of whatever nature it may be.

In carrying out my invention, I employ what I term a set up box, the specific construction of which will be hereinafter described in detail, but which by the manual positioning of certain parts such as slides, is used to close breaks in circuits including the operating magnets of a plurality of punches. When the apparatus is to be used the typewriter operator after printing the arbitrary items of a bill, or the like, such as the ledger number, date, name of customer and so on, places a sample card in the machine to assist in setting up or closing the breaks in the printing circuits which will control the punches for the numbered holes in the appropriate columns in a card to indicate all of such printed arbitrary items.

The typewriter carriage is then started from the proper point to begin the first line of the body of the bill, and while printing such line it will be advanced to a certain predetermined point, or if it does not reach it, it is stepped to such point, and by such movement it carries a contact which slides over a series of terminals for the punch circuits, whereby all of such circuits as have been set up or partially closed, will be rendered active and the punches controlled thereby will punch out the numbered holes in the columns of the card which will indicate all of the items for which the set up box has been adjusted.

After the above mentioned point in the travel of the typewriter carriage has been reached, the numeral keys of the instrument are depressed to print the figures of value in the proper columns in the bill, and these keys will operate to punch in the card holes in corresponding columns which by their position will indicate the numerals which such keys bear.

While this operation is taking place a card has been advanced through the punching attachment and a new card brought into place, whereupon the carriage is shifted back to begin and print a second or new line, and the operation above set forth is repeated for this and each succeeding line.

This specific example will serve to illustrate the general nature and purpose of the invention, but for an understanding of the mechanism which is required for carrying out the operations above set forth, and which by reason of the different character of the necessary operations including spacing of the typewriter and of the punching attachment is peculiar to itself, reference must be had to the accompanying drawings which illustrate the apparatus in its entirely.

In these drawings:

Fig. 2 is a rear view, in elevation, of the parts shown in Fig. 1.

Fig. 3 is a top plan view of the part of the base plate of the apparatus upon which the typewriter rests.

Fig. 4 is a side view of the same mechanism showing the typewriter, in dotted lines, set thereon.

Fig. 5 is a front view of a part of Fig. 4, showing the typewriter key-bars in section.

Fig. 6 is a detail of a switch mechanism controlling the zero punch.

Fig. 7 is a top plan view on an enlarged scale of the part of the punching mechanism hereinbefore referred to as the set up box.

Fig. 8 is a front elevation of the same parts, showing the escapement mechanism.

Fig. 10 is a top plan view of the punching mechanism in the set up box, the box and cards being shown in section.

Fig. 11 is a rear view of the punching attachment showing the card carrier, the contact points which correspond to the columns of numbered holes in a card, and other parts indicated by dotted lines.

Fig. 12 is a part section and part rear view of the card magazine or holding device.

Fig. 13 is a detail of the contacts, shown in dotted lines in Fig. 11 for breaking the circuit of the punch magnets while the ends of the card carrier are immediately under the same.

Fig. 14 is a part section and part plan view of the mechanism for transferring a card from the magazine to the box or receptable for the punched cards.

Fig. 16 is a detail of an attachment to the typewriter for controlling the operation of the escapement for the cards, after having been thrown out of operation by the tabulator stop on the card punch attachment.

Fig. 17 is a detail of the contact controlled by the numeral keys in the typewriter.

Fig. 18 is an end view of the punching attachment, looking from the typewriter, the base being in section.

Fig. 19 is a subtotal section of the punching attachment showing the series of punches in elevation.

Fig. 21 is a horizontal section of the card holder or magazine and the punched card carrier.

Fig. 22 is a view of the same parts showing a card and the card carrier in a position from which the card is transferred to the card receiver box.

Fig. 23 is a detail of a portion of the plate of the set up box on an enlarged scale.

Fig. 24 is a section on the line 24—24 of Fig. 23.

Fig. 25 is a part section and part elevation of a portion of the set up box, looking from the rear.

Fig. 26 is a view of a card such as is used in the machine.

Fig. 27 is a top view of the mechanism shown in Fig. 19.

Fig. 28 is an end view of the same mechanism.

Fig. 29 is a diagram showing the relations and illustrating the operation of the complete apparatus.

Figures 1, 15:
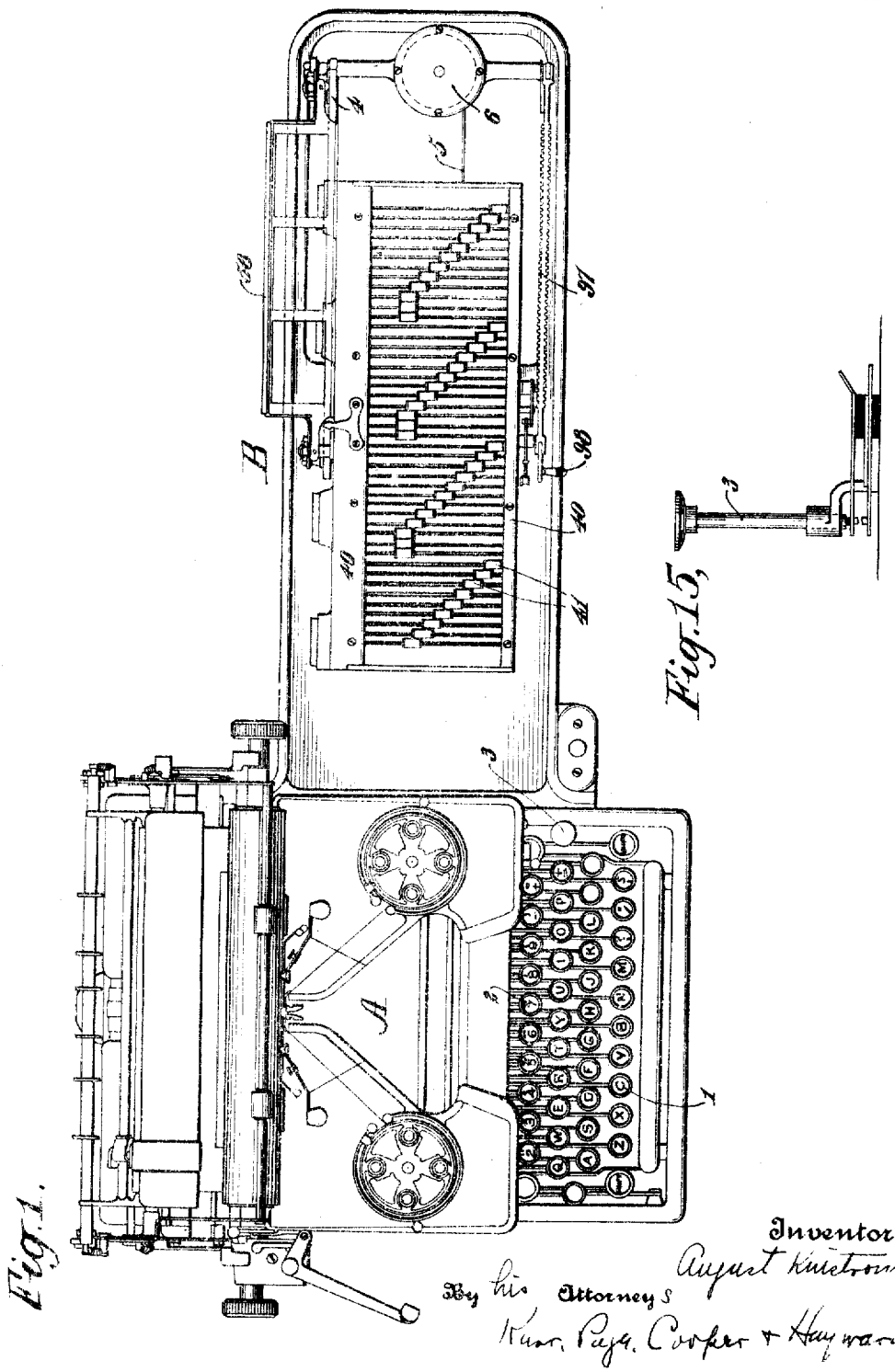
Figure 1 is a plan view of the complete machine, typewriter and punching attachment combined.
Fig. 15 is a detail of a supplemental key on the key-board for punching a hole without operating a character key.

The general plan of construction of the apparatus is illustrated in Figs. 1 and 2 in which figures a typewriter A is shown at the left, and the punching attachment B secured to the same base or bed plate, at the right. The typewriter is, or may be, of any ordinary construction which adapts it for the purposes hereinafter to be described, and is provided with the usual keyboard with letter, character and numeral keys 1 and 2. There is also an auxiliary key 3, which is operated in connection with those keys, such as that for the letter *l*, which is used both for a letter and for a numeral, to punch a hole in a card corresponding to the numeral 1.

The punching attachment B comprises a stationary set up box, a series of stationary punches, a series of stationary contacts and a movable card carrier. the construction of which will be hereinafter described in detail. By reference to Fig. 11, the numerals 4 designate the end bars of the movable card carrier, which is drawn to the right by a flexible band 5 connected with a wound spring contained in a box 6, said band being connected to a fixed stop on the base. As the carriage of the typewriter travels step by step the movable elements of the punching attachment are designed to move correspondingly, for which purpose the card carrier is provided with an escapement 7, Figs. 7 and 8, which is operated by an electro-magnet 8, Fig. 18, which when energized attracts its armature 9 which in turn raises a link 10 that oscillates a shaft 11, that carries a pawl 12 which operates through an elastic stop upon a frame 13 which is actuated by a spring 14 (see Fig. 8). The frame 13 is pivotally mounted to oscillate about pin points 15 and has a projection 16 normally in engagement with one of the teeth of the ratchet 7. When the frame is oscillated this projection releases a tooth so that the ratchet moves a step until the next tooth engages with a pivoted spring actuated pawl 17 carried by the frame, but not on the same plane as the stop 16. Each time the magnet 8 is energized, therefore, the card carrier is advanced one step.

The operation of magnet 8 is controll by the keys of the typewriter, including the spacing bar or key. For this purpose there is pivotally mounted under the keys a universal bar 18 carried by arms 19 pivoted at 20, Fig. 3. Under the universal bar 18 are contacts 21 which, on the depression of said bar, are forced down by studs 22, Fig. 4, on the bar into contact with stops electrically connected with terminals 23, these stops not being fully illustrated but omitted from the drawings to avoid complication, so that the depression of any key closes the circuit between terminals 23 and 24, the latter connected with contacts 21, and sends an impulse of current to the escapement magnet 8.

It will be noted that while the steps by which the typewriter carriage moves may be larger than those by which the card carrier advances, the movements are substantially synchronous, so that the one is always moving in correspondence with the other. This relation may be changed, when desired, as will be hereinafter described.

Figure 9:
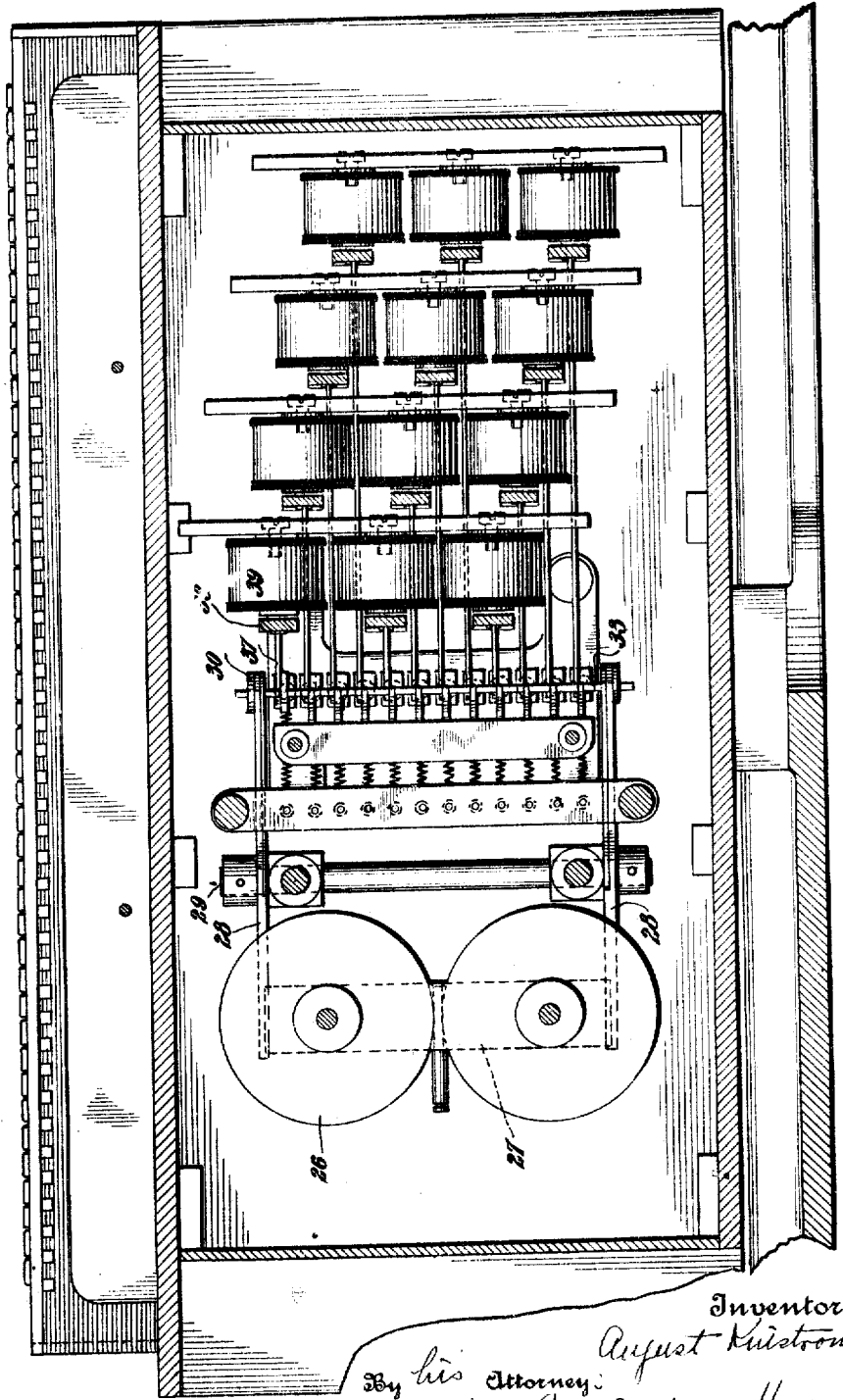
Fig. 9 is a view, in side elevation, of the mechanism inside of the set up box, the latter being shown in section.
Figure 20:
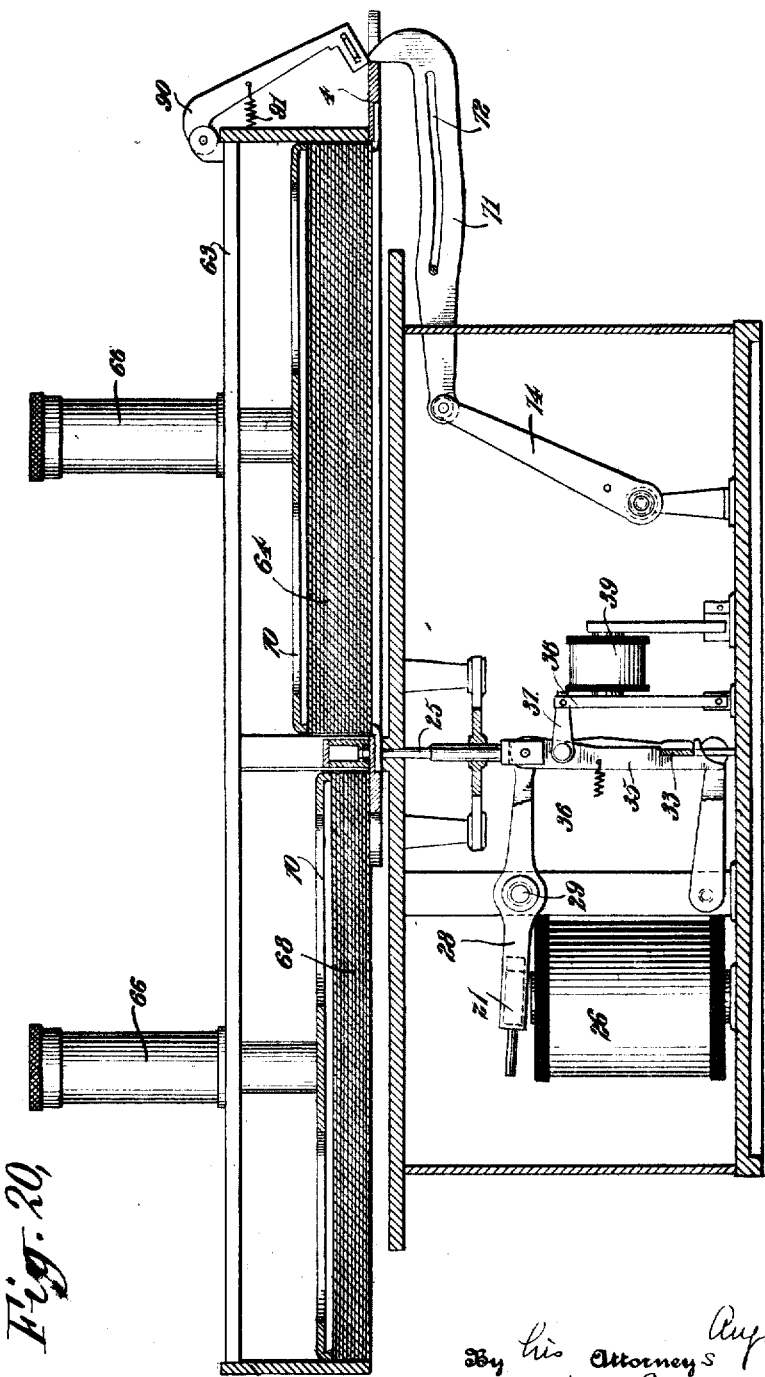
Fig. 20 is a horizontal section of the punching attachment, showing one of the selector magnets, the punch operating magnet and the punch mechanism.

In the punching attachment there is a single vertical row of punches 25, see Fig. 19, and each of these punches is reciprocated by the means shown in Figs. 9, 10 and 20. In these figures 26 is the punch-operating magnet, 27 is its armature carried by and at the ends of two arms 28, which are pivoted at 29. The opposite ends of these bars or arms are connected by links 30 with the ends of levers 31 pivoted at 32 in order that the links may maintain their vertical position while moving. The links 30 carry a transverse bar 33 and when the armature 27 is attracted to the magnet 26 this bar 33 is bodily raised.

Each punch 25 is guided by passing through a cross bar 34 and its lower end, see Fig. 20, is pivotally connected with a flat bar 35, retracted by a spring 36 and connected by a link 37 with the armature 38 of a corresponding selector or punch-controlling magnet 39. When a selector magnet 39 is energized, it draws its appropriate bar 35 toward it, and, as shown in Fig. 20, this causes a notch in said bar to engage with the transverse bar 33 so that the punch connected with any bar 35 thus locked to the bar 33 will be operated when the circuit of the punch magnet 26 is closed and the bar 33 thereby raised.

In order to explain the operation of setting up, it may be stated that the cards used with this apparatus have forty-five vertical columns of numbered holes, this being an arbitrary number, as will be understood. This requires proper provision for a corresponding number of set up devices, and there are accordingly employed two insulated and connected plates 40, see Figs. 1, 7, 23, 24 and 26, with forty-five vertical slots therein, along which travel a similar number of slide plates 41 having flat extensions 42 projecting down between insulators 43.

Properly secured in the insulator 43 on one side of each slot and extension 42 is a conducting plate 44 in electrical union with a bar 45 45 and on the other side of each slot is a conducting bar 46. Metallic heads 47 are carried by the extensions 42 and are held by spiral springs in contact with plates 46. Each extension 42 is trimmed or cut away, as shown in Fig. 25, on one side so as not to make contact with the adjacent plate 44, but it slides in contact with the opposite plate 46. By sliding the plates 41 through the slots a bar 46 may be electrically connected to any bar 44 by the contact of the spring actuated heads 47 with said plates 44.

The relation of these parts will be more readily understood by an examination of Fig. 29, from which it will be seen that when the slides 41 are set to a given number in any column, the movable head 47 connects the bar 46 with a plate 44 which in turn is connected with the bar 45. The bars 46 are connected by wires with a series of contacts 49, and moving with the card carrier and card is a contact 50 that as the card advances, travels over contacts 49, and thus in its movement through the machine this contact makes electrical connection successively with each bar 46. In Fig. 29 it will be observed only as many of the bars 46 are shown as is necessary to an understanding of the principle of operation.

As there are twelve punches in the attachment B, there must be a corresponding number of keys and levers in the typewriter to operate them. The number 12 is adopted because there are twelve months in the year and there should be a punch to correspond with the number of each month in recording dates. Referring to Figs. 2 to 5, these levers are indicated by the numeral 51 and are mounted on the bed plate beneath the key board. The nine numeral keys and three others are used for their operation, and on the depression of any one of these keys their bars engage with boot-jack attachments 52 on the ends of levers 51, and depress the latter. Said levers 51 are pivoted at 53 and when operated by the keys their free ends move upward with relation to stationary spring contacts 54. The levers are of insulating material or are insulated from the frame, but they carry conducting levers 55, see Fig. 17, the ends of which carry projections 56, see Fig. 3, which extend through the levers 51 and encounter the springs 54.

In Fig. 29 the parts marked 54 and 55 correspond to the contacts and levers similarly marked in the other figures, and by an examination of Fig. 29, it will be seen that when a numeral key is depressed and the designated parts are brought together, the circuit of a source of current 57 is closed from the frame of the machine, to the punch selector magnet set for operation by such key and thence back to the source.

It will be observed from the above description that the letter keys, except in certain instances which will be described more fully, do not of themselves operate any corresponding punches, while the numeral keys do. Taking the illustration of use given above as typical of the designed purpose of the apparatus, while the typewriter is being operated to print the letters and writing at the beginning of lines in a bill, the card undergoing printing should be punched at points which will indicate, say the date, the place, the salesman, customer and other like information. All of these data which do not involve numerals are assigned certain designating numerals which when punched out in predetermined columns in the card will represent such data.

When an operator, therefore, has written such items of a bill, a sample card is placed in a holder 58, and the slides are adjusted so that the selected designating number holes in the proper columns will be punched as the typewriter carriage moves from the position to begin a line up to that where numerals are to be printed and punched. Hence, without adjustment of the apparatus each card passing through the machine and corresponding to a line of written matter on the bill, will, by the movement of the card carrier, punch the holes to indicate all of data of the bill except the articles of merchandise described, assuming these to be different in each line, and the numerals at the ends of the lines. In practice, each article of merchandise is given a designating numeral and these may be punched by the operation of the numeral keys when the typewriter carriage has advanced to a certain predetermined point.

It has been shown that the numeral keys only punch holes in a card to designate the corresponding numerals, but we have twelve numeral-punching levers and only nine numeral keys, which requires the use of three letter or character keys for the double purpose of printing the letters and punching certain numerals. Let us take for example the key for $l$, as an illustration and assume that by its operation the numeral 1 is to be punched. To do this key 3 is first depressed and held down, which closes one break in a circuit from the source, another break being controlled by the $l$ key. When therefore the latter key is also depressed both breaks in this circuit are closed and the selector magnet for the numeral 1 punch, as well as the punch magnet which is in series with the selector magnet, are both brought into circuit and the numeral 1 hole will be punched in the appropriate column determined by the position of the traveling card carrier. It will be borne in mind that when the same $l$ key is depressed for printing a character only, and key 3 is not depressed, the selector and punch magnets are not operated. The selector, the punch and the escapement magnets, both of which last-named magnets are in series with the selector magnets are so designed that the selector magnet responds to the current and operates in advance of either of the others.

In conformity with established practice in the use of these tabulating machines, it is customary to punch at the top of each column in the card a zero whenever no hole or holes are punched at a lower point in the column. This is provided for in the present instance by the following means. In Figs. 4 and 6 a pivoted lever 60 is shown which carries a pin lying under each lever operated by a numeral key, and when a numeral key is depressed this lever separates normally closed contacts 61, which controls the zero punch circuit, and hence whenever a hole is punched by a numeral key, no zero is punched at the top of that column.

Normally all of the slides 41 are at the top of the slots in the set up box, so that a zero will be punched in each column as the contact 50 travels over the terminals 49, except in those columns where the slides have been pulled down to punch numerals at some lower point in the columns.

The main features of construction and operation which characterize my invention have now been fully set forth. In practice certain details are essential to successful operation, and these without special regard to their order will now be described.

When the punching attachment is used in connection with the typewriter a stack of cards 62, Fig. 26, is inserted, unpunched, into a holder 63, the unpunched stack being designated by the numeral 64 in the several figures. A spring 65, Fig. 14 is contained in a casing 66 and operates through a plunger 67 and a plate 70 to force the cards down toward the bottom of the holder. Alongside this holder is a second holder 69 for a stack of punched cards 68, and the unpunched cards are designated to be transferred from the first-named to the second holder over the line of punches as shown in Fig. 20.

The card carrier 4, Fig. 11, as has been described, travels from under the first to the second holder in unison with the typewriter carriage. Its normal position is immediately under the unpunched cards and the lowermost card of the stack is forced down into a recess in the carrier which is only the depth of the thickness of a single card, and this card is thereby carried across the line of punches. Fig. 14 shows the carrier in this normal position. When in such position a bar 71 having a properly developed slot 72 which works on a pin 73 in the frame, and is pivotally connected to an arm 74 pivoted to a fixed standard 75 is, by the engagement of its hooked end with the edge of the carrier, drawn to practically its limit of movement, and thereby distends a spiral spring 76, connected at one end to the frame and at the other to one of four projections 77, from a frame 78, which is supported by pivotal connections at 79, with bell crank levers 80 pivoted to the frame at 81. These levers 80 are connected with arms 74 by a link 92.

When the carrier has practically completed its forward movement a post on the inside edge 82, shown in dotted lines in Fig. 11, encounters a latch 83 carried at the upper end of a lever 84 pivoted at 85 to a fixed standard 86, moving it and with it the end of lever 84 in the direction of travel of the carrier. The latch 83 is practically rigid with the arm 84, being adjustably secured thereto by any suitable means, and when forced to one side by the carrier it swings a notch in the arm 84 out of engagement with a squared stud 87 on one arm of one of the bell crank levers 80, which allows the said arm by rotation on the center 81 to rise in obedience to the tension of the spring 76.

By this movement of the bell crank lever 80 the frame 78, the feet of projections of which are pivotally connected with levers 80, is thrown to the left and two flat bars 88 pivoted to the lever 80 and to a corresponding lever under the same which is not shown in detail, are raised against the card in the carrier passing through the open portion of the carrier and forcing said card up against the stack of punched cards 68. This action is facilitated by means of pivoted arms 89 pivoted to another pair of bell crank levers 80 and controlled by the frame 78 with suitable stops which raise the said arms when the frame 78 is moved to the left.

When the card carrier has moved beyond the right hand end of the unpunched card holder arms 90 pivoted to the holder and actuated by spring 91 comes under the stack of cards and holds them in position, this being permitted by the fact that the properly shaped end of arms 90 follow the carrier and are in engagement therewith until they have stopped under the cards.

While the card carrier is moving it is not only longer than a card, but it is manifest that the punches should be operated only while certain portions of a card are over them and at no other times. To accomplish this I secure to the frame two circuit controllers 94, Figs. 11 and 13, and at the center of the card carrier I place a stud 95 which near the limit of movement of the carrier passes under a flat tail piece 96 of the pivoted circuit controller 94 and thereby shifts such controller to a position in which it breaks the circuit of the punch magnet 26 so that it cannot be operated except when the proper portion of a card is over the punches.

In practice it may be desired to arrest the advance of the card carrier at different points according to the length of the typewritten line preceding the numerals at the end of the line. By this means a shorter or longer typewritten line may result in the punching in the appropriate columns in a card of the holes which indicate the arbitrary items, such as dates, places, persons and the like, and after this has been done the card carrier should be again started in motion to receive the punched holes due to the operation of the numeral keys.

The means which I have provided for accomplishing this are shown mainly in Figs. 7, 8, 16, 27 and 28. In these figures, 97 is a notched bar parallel with the line of travel of the card carrier, and fixed in position. On its end it carries a stop 98, which serves as a support for the fingers when a similar stop 99 on the escapement bar is to be raised to free the carrier from the escapement when it is wished to move it back or forth without resistance. For use with the bar 97 there are provided spring clamps 100 (see Fig. 19), which may be forced down to straddle the bar at any desired point.

On the frame is pivoted a lever 101 at the point 102 which by its movement controls a circuit controller 103 and this lever has a double beveled end which lies in the path of a shoulder on the spring clamp 100. By the forward movement of the card carrier a clamp 100, which may have been attached to the bar 97 in a predetermined position, is brought into engagement with one side of the beveled end of the lever 101 and by the first movement permitted to it by the escapement it shifts such lever and thereby breaks the circuit through the controller 103. This, as will be seen from Fig. 29, breaks the circuit of the escapement magnet 8 and hence the typewriter carriage may continue to advance although the card carrier is arrested and remains stationary.

On the rear of the typewriter as shown in Figs. 2, 16, 27 and 28, is a regular tabulating stop bar 104. For this bar there are provided spring stops 105 which may be forced down upon the bar at any desired point. One of these stops is caused to straddle the bar 104 at any desired point with reference to the travel of the typewriter carriage, at which it may be desired to start up the card carrier after the latter has been arrested by the means above described.

One leg of the stop 105 is prolonged so that it lies in the path of a double beveled piece 106 secured to a post 107 on a lever 108 pivoted to the typewriter frame. When the long leg of the stop encounters the piece 106 the lever 108 is shifted and this lever forms part of a circuit controller 107 which is closed by the movement thereby imparted to it. By this means, as may be seen from Fig. 29, an impulse of current flows through the escapement magnet which being energized starts up the card carrier, whereupon the normal conditions are reëstablished and the carrier is thereafter advanced by the escapement magnet.

Referring now to Fig. 29 there are two circuit controllers 110 and 111 which are designed to be controlled by the universal bar 18 under all the keys of the typewriter. When, therefore, any key is depressed this bar will be forced down and by its movement it closes the controller 110 first, thereby energizing the escapement magnet 8 allowing the card carrier to move through the portion of a step to bring the card into the position for punching. Then by a further depression of a key the universal bar is forced farther down to close the circuit through the controller 111, which energizes the punch magnet 26. Upon the release of the key these controllers successively break their circuits but in the reverse order so that the punch may be withdrawn from the card before the latter is advanced on its next step.

From the foregoing it will be apparent that the operation of the punches as controlled by the adjustable set up devices will be effected by and upon the depression of any key in the typewriter whether numeral or letter when the typewriter carriage is in predetermined positions of travel. Ordinarily, however, the numeral keys would not be depressed by the operator at such times, since the particular field of travel would be reserved for descriptive matter written by the character keys.

Having now described my invention and the preferred manner of carrying out the same, what I claim is:

1. The combination with a typewriting machine of a tabulator card punching attachment, punches therein, electromagnets in the attachment for selectively controlling the operation of the punches, circuits controlled by the numeral keys and special keys in the typewriter for operating said magnets, the letter character keys in said typewriter being in themselves ineffective to control the operation of said punches, and means operated by all of the keys of the typewriter for moving cards through the punching attachment in unison with the typewriter carriage.

2. The combination with a typewriting machine of a tabulator card punching attachment and a card carrier thereon, punches therein, electro-magnetic means in the punching attachment for operating the punches, circuits controlled by the numeral keys and special keys in the typewriter for operating the numeral hole punches, means operated by all the keys of the typewriter for moving the card carrier with relation to the punching attachment in unison with the typewriter carriage, adjustable set up devices, and circuits controlled thereby and by a contact attached to the movable card carrier of the punching attachment for punching other numeral holes during the advance of the card carrier.

3. The combination with a typewriting machine of a tabulator card punching attachment, a card carrier thereon movable in unison with the typewriter carriage, punches therein, electro-magnets for controlling the operation of the punches, circuits controlled by the numeral and special keys in the typewriter for energizing said magnets to effect the punching of holes corresponding to the numerals which said keys bear or represent, means connected with the punching attachment for closing breaks in the circuit of any punch controlling magnet and a contact traveling with the card carrier which closes a second break in said circuits when said contact is brought into operative relation with the break closing means connected with the punching attachment.

4. The combination with a typewriting machine of a tabulator card punching attachment, a carrier for moving cards over the punches in unison with the movement of the typewriter carriage, a series of punch controlling magnets, circuits therefor and a series of conductors, sliding contacts for closing breaks in the circuit from any punch controlling magnet to any one of a series of conductors corresponding in number and position to the columns of a card and a contact movable with the card carrier which when it meets the conductor so connected with a punch controlling magnet closes a second break in the circuit of such magnet and operates the punch corresponding thereto to punch a hole indicating such number in the desired column of a card.

5. The combination with a typewriting machine of a tabulator card punching attachment, a movable card carrier and an electro-magnetic escapement for controlling the advance of the same, a circuit to the escapement controlled by all of the typewriter keys, a series of punches over which cards in the carrier are advanced step by step, magnets for controlling said punches, adjustable set up devices, and circuits including said magnets controlled by certain typewriter keys and by the adjustable set up devices cooperating with the movable card carrier for controlling the punch magnets at times when the other keys are being operated.

6. The combination with a typewriting machine of a tabulator card punching attachment therefor, a movable card carrier thereon, an escapement magnet for controlling the advance of the same, a circuit including said magnet, a universal bar operated by all of the typewriter keys for controlling said circuit, a series of punches, magnets for controlling the operation of the same controlled by certain of the typewriter keys, a contact carried by the card carrier, a series of terminals corresponding to the columns on a card over which said contact travels, and means for connecting any punch magnet to any one of said terminals whereby a numeral hole may be punched in any column during the advance of the typewriter carriage and card carrier by other means than by a punch controlling key.

7. The combination with a typewriting machine of a tabulator card punching attachment therefor, a movable card carrier thereon, a series of punches and magnets for controlling the same, circuits including said magnets controlled by the numeral keys of the typewriter, a special key, and contacts operated conjointly thereby and certain of the character keys for controlling punch magnet circuits.

8. The combination with a typewriting machine of a tabulator card punching attachment therefor, a movable card carrier thereon, an escapement magnet for advancing the card carrier controlled in its operation by all of the typewriter keys, adjustable stops on the card carrier for throwing said escapement magnet out of circuit and arresting the movement of said carrier while the keys are being operated and means for returning said escapement magnet to its circuit at any predetermined point in the advance of the typewriter carriage.

9. The combination with a typewriting machine of a tabulator card punching attachment therefor, a card carrier thereon movable in unison with the typewriter carriage, a series of punches and magnets for controlling the operation of the same, and contacts controlled by the movable card carrier for throwing the punching mechanism out of operation except during the period in which the position of the card to be punched is over the punches.

10. The combination with a typewriting machine of a tabulator card punching attachment therefor, a movable card carrier thereon, comprising two card receptacles one for unpunched the other for punched cards, and means for transferring the cards from the unpunched receptacle to the movable carrier and from the latter to the other receptacle at the end of the travel of said cards.

11. The combination with a typewriting machine of a tabulator card-punching attachment having a card carrier thereon, and punches therein for punching numeral holes in the cards, electromagnetic means in the punching attachment for operating the punches, circuits controlled by the numeral keys and special keys for controlling the operation of the numeral hole punches, said punches being normally ineffective to punch upon the operation of any of the letter keys, means operated by all of the keys of the typewriter for moving the card carrier with relation to the punching attachment in unison with the typewriter carriage, adjustable set up devices, and circuits controlled thereby adapted to cause said punches to punch upon the operation of any of the letter keys when the carrier is in predetermined positions.

12. The combination with a typewriting machine, of a tabulator card-punching attachment, punches therein, electromagnets in the attachment for controlling the operation of the punches, circuits controlled by the numeral keys and special keys in the typewriter for operating the said magnets, an actuating magnet for effecting the operation of said punches as selected by the aforesaid electromagnets, and means operated by all of the keys of the typewriter for moving cards through the punching attachment in unison with the typewriter carriage.

13. The combination with a typewriting machine, of a card-punching attachment therefor, a movable card carrier thereon, a series of punches and electromagnetic means for controlling the same, and a series of circuits controlled by the numeral keys of the typewriter for controlling the electromagnetic means, the letter character keys of the typewriter being normally in themselves ineffective to control said circuits.

14. The combination with a typewriting machine, of a card-punching attachment therefor, a movable card carrier thereon, a series of punches and electromagnetic means for controlling the same, a series of circuits controlled by the numeral keys of the typewriter for controlling the electromagnetic means, the letter character keys of the typewriter being normally in themselves ineffective to control said circuits, and means controlling the punch magnet circuits operable by the operation of either letter or numeral keys when the typewriter carriage is in predetermined points of travel.

15. The combination with a typewriting machine, of a tabulator card-punching attachment and a card carrier thereon, punches for perforating numeral holes in the cards, electromagnetic means in the punching attachment for operating the punches, circuits controlled by the numeral keys in the typewriter and by letter numeral character keys supplemented by special keys for operating the numeral hole punches, and means operated by all of the keys of the typewriter for moving the card carrier with relation to the punching attachment in unison with the typewriter carriage.

16. The combination with a typewriting machine, of a tabulator card-punching attachment, of punches therein for perforating numeral holes in the cards, electromagnetic means in the latter for controlling the operation of the punches, means operated by all of the keys of the typewriter for moving cards through the punching attachment in unison with the typewriter carriage, and means controlled by the operation of any of the keys of the typewriter for effecting predetermined numerical punchings in said cards when the cards are in predetermined relative positions with respect to the punching attachment and corresponding with predetermined typewriter carriage positions.

17. The combination with a typewriting machine, of a tabulator card-punching attachment, punches therein, electromagnetic means in the latter for controlling the operation of the punches, means operated by all of the keys of the typewriter for moving cards through the punching attachment in unison with the typewriter carriage, and a plurality of adjustable set-up devices for controlling the punching of predetermined numerical data upon said cards, said devices being operative to control a punching operation upon the typewriter carriage moving past certain predetermined positions.

18. The invention set forth in claim 17 in which a plurality of groups of adjustable set-up devices are provided, each said group controlling the punching of data upon said cards in independent fields, which fields correspond with particular ranges of travel of the typewriter carriage.

19. The combination with a typewriting machine, of a tabulator card-punching attachment, punches therein for perforating numeral holes in the cards, electromagnetic means in the latter for controlling the operation of the punches, circuits to said electromagnetic means for controlling the operation of said means upon the depression of numeral keys in the typewriter, means operated by all of the keys of the typewriter for moving cards through the punching attachment in unison with the movement of the typewriter carriage, and means including adjustable set-up devices controlled by the operation of any of the keys of the typewriter for controlling predetermined numerical punchings upon said cards independently of the operation of the numeral keys, said last-mentioned punching being effected when the typewriter carriage is in predetermined positions of travel and when the cards are in corresponding positions relative to the card carrier.

In testimony whereof I hereunto affix my signature.

AUGUST KNISTROM.